United States Patent [19]
Glatz

[11] Patent Number: 6,122,885
[45] Date of Patent: *Sep. 26, 2000

[54] DYNAMIC STRUCTURAL BEAM

[76] Inventor: Jeffrey D. Glatz, 13 Latchstring La., Hatboro, Pa. 19040

[*] Notice: This patent issued on a continued prosecution application filed under 37 CFR 1.53(d), and is subject to the twenty year patent term provisions of 35 U.S.C. 154(a)(2).

[21] Appl. No.: 08/953,566

[22] Filed: Oct. 17, 1997

[51] Int. Cl.[7] .................................................. F16F 7/12
[52] U.S. Cl. .......................... 52/731.1; 52/728; 52/730.7; 52/795; 188/377
[58] Field of Search ................................ 52/721.4, 723.1, 52/724.1, 724.5, 730.1, 733.2, 309.4, 309.8, 309.13, 731.1, 730.7, 731.7, 729.2, 729.1, 729.4; 5/728, 795, 740; 188/371, 372, 377

[56] References Cited

U.S. PATENT DOCUMENTS

| | | | |
|---|---|---|---|
| 1,382,106 | 6/1921 | McKenzie | 52/724.1 X |
| 3,462,907 | 8/1969 | McKean | 52/736.2 |
| 3,677,874 | 7/1972 | Sterrett et al. | 52/309.4 X |
| 4,216,634 | 8/1980 | Binder | 52/309.8 X |
| 4,359,849 | 11/1982 | Goeman | 52/309.4 X |
| 4,486,995 | 12/1984 | Allen et al. | 52/309.8 |
| 4,745,718 | 5/1988 | O'Sullivan et al. | 52/730.7 X |
| 4,843,777 | 7/1989 | Shimabukuro | 52/731.1 X |
| 5,033,593 | 7/1991 | Kazuhito | 188/377 |
| 5,048,167 | 9/1991 | Heffley et al. | 5/728 X |
| 5,081,810 | 1/1992 | Emmert | 52/309.4 X |
| 5,165,752 | 11/1992 | Terry | 297/214 |
| 5,412,921 | 5/1995 | Tripp | 52/729.2 |
| 5,497,595 | 3/1996 | Kalinin | 52/730.7 X |
| 5,553,924 | 9/1996 | Cantor et al. | 297/452.27 |
| 5,565,257 | 10/1996 | Tingley | 52/730.7 X |
| 5,572,832 | 11/1996 | Haavisto et al. | 52/731.1 X |
| 5,669,094 | 9/1997 | Swanson | 5/740 |
| 5,744,228 | 4/1998 | Tingley | 52/730.7 X |
| 5,836,547 | 11/1998 | Koch et al. | 244/122 R |
| 5,884,879 | 3/1999 | Gruenenfelder | 248/118 |

OTHER PUBLICATIONS

Avallone, Eugene A. Marks' Standard Handbook for Mechanical Engineers. New York: McGraw–Hill. 1996. pp. 5–21–5–32.

*Primary Examiner*—Richard Chilcot
*Attorney, Agent, or Firm*—William H. Eilberg

[57] ABSTRACT

A structural beam or flexural member, supported only at its ends, has a load carrying capability which is proportional to the relative acceleration between the applied force(s) and the reaction force(s). In a first preferred embodiment, the upper section of the beam is made of a compressive rate-sensitive material, and the lower section of the beam is made of a homogeneous material. The compressive rate-sensitive material accommodates most of the compressive stress encountered in dynamic stress conditions. The homogeneous material accommodates most of the compressive stresses during static or quasi-static conditions and tensile stresses during static, quasi-static and dynamic stress conditions. In a second preferred embodiment, the beam has an upper section made of a compressive rate-sensitive material, a middle section made of a homogeneous material, and a lower section made of a tensile material. The compressive rate-sensitive material functions as in the first embodiment. The homogeneous material accommodates primarily compressive stresses during static or quasi-static conditions. The tensile material accommodates primarily tensile stresses during static, quasi-static, and tensile stress conditions.

6 Claims, 1 Drawing Sheet

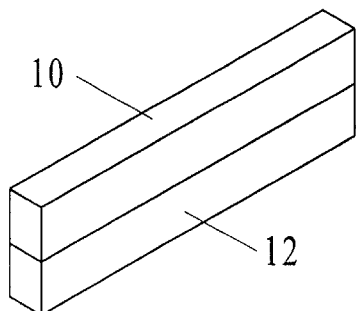
Figure 1
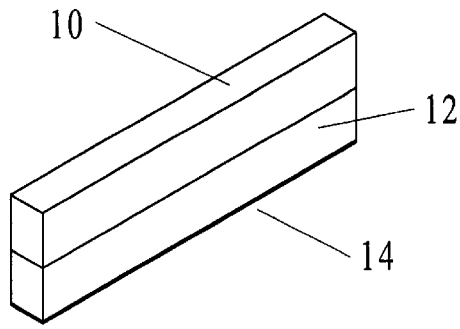
Figure 2
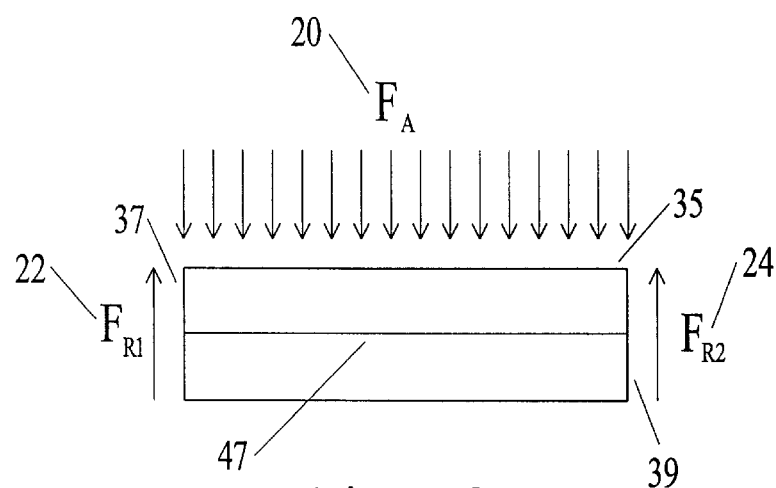
Figure 3
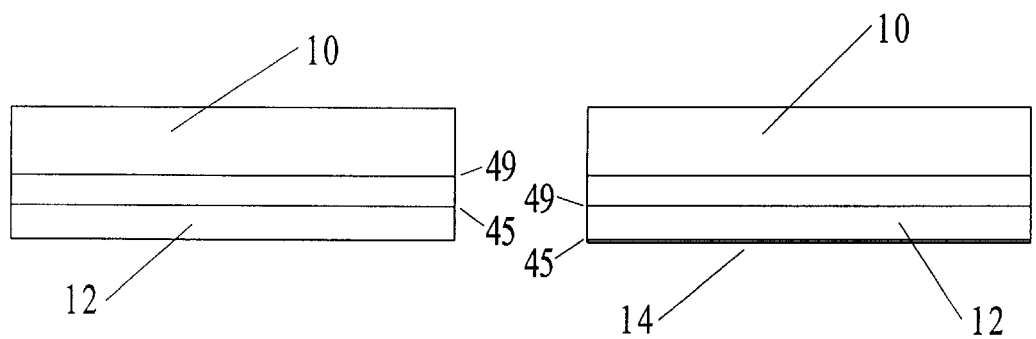
Figure 4
Figure 5

DYNAMIC STRUCTURAL BEAM

BACKGROUND

1. Field of Invention

This invention relates to structural elements, specifically it defines a structural beam, or flexural member, whose load carrying capability is proportional to the relative acceleration between the applied force(s) and the reacted force(s).

2. Discussion of Prior Art

Structural beams are a component of many of the items we come in contact with in our daily lives. Most of these items are designed to function in our typical acceleration environment. That is, they are designed to static or quasi-static structural load requirements. Static is defined as when there is no relative acceleration between the applied and reacted force(s). And, quasi-static is defined as when there is minimal relative acceleration between the applied and reacted force(s). Notable examples of items designed for this static/quasi-static environment are a building or an automobile. Some of these items, or parts they contain, are designed to function occasionally at higher acceleration levels. These are designed to dynamic structural load requirements in addition to the static/quasi-static structural load requirements. Dynamic is defined as when there is significant relative acceleration between the applied and reacted force(s). A notable example of an item designed to function occasionally in the dynamic environment in addition to the static/quasi-static environment is an automobile bumper.

Current structural beams have a load carrying capability that is unaffected by the relative acceleration between the applied and reacted force(s). This is caused by the materials they contain. The materials currently utilized in beams are unaffected by the relative acceleration between the applied and reacted force(s). Examples of these materials are: steel, aluminum, and titanium in homogeneous structures; and, fiberglass, foam, and epoxy in composite structures.

Current structural beams are unable to be optimized for use in the static/quasi-static and dynamic environment. The materials they contain result in a beam that can be optimized to either the static/quasi-static or dynamic environment but not both. When designed for use in the static/quasi-static and dynamic environment compromises result that limit the overall effectiveness of the item.

OBJECTS AND ADVANTAGES

The object of the Dynamic Structural Beam is to provide a structural beam, or flexural member, whose load carrying capability is proportional to the relative acceleration between the applied force(s) and the reacted force(s).

The advantage of the Dynamic Structural Beam is that it will provide a structural beam, or flexural member, that can be optimized to both the static/quasi-static and dynamic structural load requirements.

DESCRIPTION OF DRAWINGS

FIG. 1 shows an isometric view of the main embodiment of the Dynamic Structural Beam.

FIG. 2 shows an isometric view of the principle alternate embodiment of the Dynamic Structural Beam.

FIG. 3 shows a side view of a typical structural beam.

FIG. 4 shows a side view of the main embodiment of the Dynamic Structural Beam.

FIG. 5 shows a side view of the principle alternate embodiment of the Dynamic Structural Beam.

LIST OF REFERENCE NUMERALS

10 Compressive Rate Sensitive Material
12 Homogeneous Material
14 Tensile Material
20 Force $F_A$
22 Force $F_{R1}$
24 Force $F_{R2}$
35 Upper Surface
37 End
39 Opposite End
45 Static/Quasi-Static Neutral Surface
47 Neutral Surface
49 Dynamic Neutral Surface Summary This invention describes a structural beam, or flexural member, whose load carrying capability is proportional to the relative acceleration between the applied force(s) and the reacted force(s).

Description of Invention

The description of the Dynamic Structural Beam will contain two parts. The first will describe the materials/components used in the invention. This will consist of definitions that will classify the materials used by their structural properties. The second part will describe the two main embodiments of the invention.

Definitions:

Rate Sensitive—the load carrying capability of the material is proportional to the relative acceleration between the applied force(s) and the reacted force(s).

Non Rate Sensitive—the load carrying capability of the material is independent of the relative acceleration between the applied force(s) and the reacted force(s).

Compressive Rate Sensitive Material—a material that has a compressive load carrying capability in the dynamic environment that is significantly greater than its minimal: compressive load carrying capability in the static/quasi-static environment; tensile load carrying capability in the static/quasi-static environment; or, tensile load carrying capability in the dynamic environment. And, it is rate sensitive. Rate sensitive foams are in this class.

Homogeneous Material—a material that has a load carrying capability that is uniform. That is, the compressive load carrying capability of the material in the static/quasi-static environment is approximately equal to: the tensile load carrying capability of the material in the static/quasi-static environment; the compressive load carrying capability of the material in the dynamic environment; or, the tensile load carrying capability of the material in the dynamic environment. And, it is non rate sensitive. There are many materials in this class. The most notable are metals. Some foams are also in this class.

Tensile Material—a material that has a tensile load carrying capability in the static/quasi-static environment that is approximately equal to its tensile load carrying capability in the dynamic environment. And, these are significantly greater than its minimal: compressive load carrying capability in the static/quasi-static environment; or, compressive load carrying capability in the dynamic environment. And, it is non rate sensitive. The most notable materials in this class are fabrics.

The main embodiment of the Dynamic Structural Beam is illustrated in FIG. 1. It comprises: a Compressive Rate Sensitive Material 10 located in the upper section of the beam; and, a Homogeneous Material 12 located in the lower section of the beam. Typically, the Compressive Rate Sensitive Material 10 will be a rate sensitive foam such as EAR Specialty Composites Confor Foam. And, the Homogeneous Material 12 will be a typical foam, which is not rate sensitive.

The principle alternate embodiment of the Dynamic Structural Beam is illustrated in FIG. 2. In this embodiment, it comprises: the Compressive Rate Sensitive Material 10 located in the upper section of the beam; the Homogeneous Material 12 located in the middle section of the beam; and, a Tensile Material 14 located in the lower section of the beam. Typically, the Tensile Material 14 will be a structural fabric such as Dupont's Kevlar or Allied Chemical's Spectra.

Operation of Invention

The description of the operation of the Dynamic Structural Beam will contain two parts. The first part will describe the components and operation of a typical structural beam. This will provide a baseline for an understanding of the components and operation of this invention. The second part will describe the operation of the two principle embodiments of the Dynamic Structural Beam. These descriptions will discuss the function of the components and the structural integrity of the invention in, and as it transitions between, the static/quasi-static and dynamic environment.

FIG. 3 is a side view of a typical structural beam. A Force $F_A$ 20, concentrated or distributed, is applied to an Upper Surface 35 of the beam. The Force $F_A$ 20 is balanced by a reacted Force $F_{R1}$ 22 at an End 37 of the beam and a second reacted Force $F_{R2}$ 24 at an Opposite End 39 of the beam. The Forces $F_A$ 20, $F_{R1}$ 22, and $F_{R2}$ 24 cause internal stresses in the beam. This results in the formation of a Neutral Surface 47 along the beam. At the Neutral Surface 47 the internal stresses are zero. Above the Neutral Surface 47 the internal stresses are in compression. And, below the Neutral Surface 47 the internal stresses are in tension.

FIG. 4 is a side view of the main embodiment of the Dynamic Structural Beam. For clarity, the Forces $F_A$ 20, $F_{R1}$ 22, $F_{R2}$ 24 and their locations Upper Surface 35, End 37, Opposite End 39 are not shown.

In the static/quasi-static environment the compressive load carrying capability of the Homogeneous Material 12 is significantly greater than that of the Compressive Rate Sensitive Material 10. And, the tensile load carrying capability of the Homogeneous Material 12 is significantly greater than that of the Compressive Rate Sensitive Material 10. The Homogeneous Material 12 will provide the majority of the load carrying capability of the compressive stresses. And, it will also provide the majority of the load carrying capability of the tensile stresses. This will cause a Static/Quasi-Static Neutral Surface 45 to be approximately located along the center of the Homogeneous Material 12.

In the dynamic environment the compressive load carrying capability of the Compressive Rate Sensitive Material 10 is significantly greater than that of the Homogeneous Material 12. And, the tensile load carrying capability of the Homogeneous Material 12 is significantly greater than that of the Compressive Rate Sensitive Material 10. The Compressive Rate Sensitive Material 10 will provide the majority of the load carrying capability of the compressive stresses. And, the Homogeneous Material 12 will provide the majority of the load carrying capability of the tensile stresses. This will cause a Dynamic Neutral Surface 49 to be approximately located near the coincident surface between the Compressive Rate Sensitive Material 10 and the Homogeneous Material 12.

As can be seen, the Homogeneous Material 12 provides the tensile stress load carrying capability for both the static/quasi-static and dynamic environment. And, as the acceleration transitions from the static/quasi-static to the dynamic environment two events occur. First, the majority of the compressive stress load carrying capability transitions from the Homogeneous Material 12 to the Compressive Rate Sensitive Material 10. And, second, the Neutral Surface 47 transitions from the Static/Quasi-Static Neutral Surface 45 to the Dynamic Neutral Surface 49. As is readily apparent, for all locations of the Neutral Surface 47 between the Static/Quasi-Static Neutral Surface 45 and the Dynamic Neutral Surface 49 the beam has structural integrity. In addition, the structural behavior of the Compressive Rate Sensitive Material 10 in the dynamic environment results in the compressive load carrying capability of the beam being proportional to the relative acceleration between the applied and reacted force(s). This causes the overall load carrying capability of the beam to also be proportional to the relative acceleration.

FIG. 5 is a side view of the principle alternate embodiment of the Dynamic Structural Beam. For clarity, the Forces $F_A$ 20, $F_{R1}$ 22, $F_{R2}$ 24 and their locations Upper Surface 35, End 37, Opposite End 39 are not shown.

In the static/quasi-static environment the compressive load carrying capability of the Homogeneous Material 12 is significantly greater than that of the Compressive Rate Sensitive Material 10, or the Tensile Material 14. And, the tensile load carrying capability of the Tensile Material 14 is significantly greater than that of the Compressive Rate Sensitive material 10, or the Homogeneous Material 12. The Homogeneous Material 12 will provide the majority of the load carrying capability of the compressive stresses. And, the tensile Material 14 will provide the majority of the load carrying capability of the tensile stresses. This will cause the Static/Quasi-Static Neutral Surface 45 to be approximately located along the coincident surface between the Homogeneous Material 12 and the Tensile Material 14.

In the dynamic environment the compressive load carrying capability of the Compressive Rate Sensitive Material 10 is significantly greater than that of the Homogeneous Material 12, or the Tensile Material 14. And, the tensile load carrying capability of the Tensile Material 14 is significantly greater than that of the Compressive Rate Sensitive Material 10, or the Homogeneous Material 12. The Compressive Rate Sensitive Material 10 will provide the majority of the load carrying capability of the compressive stresses. And, the Tensile Material 14 will provide the majority of the load carrying capability of the tensile stresses. This will cause the Dynamic Neutral Surface 49 to be approximately located along the center of the Homogeneous Material 12.

As can be seen, the Tensile Material 14 provides the tensile stress load carrying capability for both the static/quasi-static and dynamic environment. And, as the acceleration transitions from the static/quasi-static to the dynamic environment two events occur. First, the majority of the compressive stress load carrying capability transitions from the Homogeneous Material 12 to the Compressive Rate Sensitive Material 10. And, second, the Neutral Surface 47 transitions from the Static/Quasi-Static Neutral Surface 45 to the Dynamic Neutral Surface 49. As is readily apparent, for all locations of the Neutral Surface 47 between the Static/Quasi-Static Neutral Surface 45 and the Dynamic Neutral Surface 49 the beam has structural integrity. In addition, the structural behavior of the Compressive Rate Sensitive Material 10 in the dynamic environment results in the compressive load carrying capability of the beam being proportional to the relative acceleration between the applied and reacted force(s). This causes the overall load carrying capability of the beam to also be proportional to the relative acceleration.

Conclusion, Ramifications, and Scope of Invention

Thus the reader will see that the Dynamic Structural Beam provides a structural beam, or flexural member, whose load carrying capability is proportional to the relative acceleration between the applied force(s) and the reacted force(s).

While my above description contains many specificities, these should not be construed as limitations on the scope of the invention, but rather as an exemplification of two of the preferred embodiments thereof. Many other variations are possible. For example:

(a) it is possible to layer the materials such that the structural beam will function when the force is applied from either the upper or lower surface; and, (b) as can be seen there are many combinations of material types that will function as a Dynamic Structural Beam as defined above. Many of these are composed of materials with properties that currently do not exist or may never exist. And, for brevity are not mentioned.

Accordingly, the scope of the invention should be determined not by the embodiments illustrated, but by the appended claims and their legal equivalents.

I claim:

1. A dynamic structural beam having an upper section, a middle section, and a lower section, the beam having two ends, the beam being supported only at said two ends, the upper section of the beam comprising a first material having a load-carrying capability which is proportional to a relative acceleration between an applied force and a reaction force, the middle section of the beam comprising a second material having a load-carrying capability which is independent of a relative acceleration between an applied force and a reaction force, and the lower section of the beam comprising a third material having a load-carrying capability independent of a relative acceleration between an applied force and a reaction force, the second material having a compressive load-carrying capability greater than that of the third material, and the third material having a tensile load-carrying capability greater than tensile load-carrying capabilities of each of the first and second materials.

2. The dynamic structural beam of claim 1, wherein the first material has a compressive load-carrying capability greater than a compressive load-carrying capability of the second material, in a dynamic environment.

3. The dynamic structural beam of claim 1, wherein the second material has a compressive load-carrying capability which is greater than a compressive load-carrying capability of the first material, in a static or quasi-static environment.

4. The dynamic structural beam of claim 2, wherein the second material has a compressive load-carrying capability which is greater than a compressive load-carrying capability of the first material, in a static or quasi-static environment.

5. The dynamic structural beam of claim 1, wherein the upper, middle, and lower sections have a substantially uniform cross-section, and wherein the beam has a substantially uniform cross-section.

6. In combination, a dynamic structural beam having an upper section, a middle section, and a lower section, the beam having two ends, the upper section of the beam comprising a first material having a load-carrying capability which is proportional to a relative acceleration between an applied force and a reaction force, the middle section of the beam comprising a second material having a load-carrying capability which is independent of a relative acceleration between an applied force and a reaction force, and the lower section of the beam comprising a third material having a load-carrying capability independent of a relative acceleration between an applied force and a reaction force, the second material having a compressive load-carrying capability greater than that of the third material, and the third material having a tensile load-carrying capability greater than tensile load-carrying capabilities of each of the first and second materials, and means for supporting the beam only at said two ends.

* * * * *